United States Patent
Imaoka et al.

(10) Patent No.: US 11,060,477 B2
(45) Date of Patent: Jul. 13, 2021

(54) FUEL INJECTION CONTROL METHOD AND FUEL INJECTION DEVICE OF SPARK IGNITION TYPE INTERNAL-COMBUSTION ENGINE

(71) Applicant: Nissan Motor Co., Ltd., Kanagawa (JP)

(72) Inventors: Yoshihiro Imaoka, Kanagawa (JP); Yoshihiko Iwabuchi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/649,035

(22) PCT Filed: Sep. 20, 2017

(86) PCT No.: PCT/JP2017/033897
§ 371 (c)(1),
(2) Date: Mar. 19, 2020

(87) PCT Pub. No.: WO2019/058452
PCT Pub. Date: Mar. 28, 2019

(65) Prior Publication Data
US 2020/0232410 A1 Jul. 23, 2020

(51) Int. Cl.
*F02D 41/40* (2006.01)
*F02F 3/28* (2006.01)
*F02M 61/14* (2006.01)

(52) U.S. Cl.
CPC .............. *F02D 41/401* (2013.01); *F02F 3/28* (2013.01); *F02M 61/14* (2013.01);
(Continued)

(58) Field of Classification Search
CPC .............. F02B 2023/103; F02B 23/101; F02B 23/104; F02D 2200/021; F02D 2200/0406;
(Continued)

(56) References Cited

U.S. PATENT DOCUMENTS

| 2015/0159580 | A1* | 6/2015 | Matsuda | F02D 37/02 701/104 |
| 2017/0045023 | A1* | 2/2017 | Kolhouse | F02M 37/0052 |
| 2018/0149107 | A1* | 5/2018 | Morris | F02M 57/005 |

FOREIGN PATENT DOCUMENTS

| JP | 2002227685 A | 8/2002 |
| JP | 2003322046 A | 11/2003 |

(Continued)

*Primary Examiner* — Carl C Staubach
(74) *Attorney, Agent, or Firm* — Osha Bergman Watanabe & Burton LLP

(57) ABSTRACT

A spark ignition internal combustion engine includes: intake and exhaust valves disposed at a ceiling part of a combustion chamber; and a fuel injection valve including a tip end portion including injection holes, and being structured to inject fuel through the injection holes toward a crown of a piston, wherein the tip end portion of the fuel injection valve is arranged in a region of the ceiling part surrounded by the intake and exhaust valves. A fuel injection control includes: determining a tip end portion fuel temperature directly or indirectly, which is a temperature of fuel at the tip end portion of the fuel injection valve; and setting a fuel injection timing advanced, in response to a condition that the tip end portion fuel temperature is higher than a temperature threshold value, wherein the temperature threshold value relates to flash boiling of fuel at the injection holes.

18 Claims, 10 Drawing Sheets

(52) U.S. Cl.
CPC .................. *F02D 2200/021* (2013.01); *F02D 2200/0406* (2013.01); *F02D 2200/0606* (2013.01); *F02D 2200/101* (2013.01)

(58) Field of Classification Search
CPC ....... F02D 2200/0606; F02D 2200/101; F02D 41/04; F02D 41/401; F02F 3/28; F02M 51/00; F02M 61/14
See application file for complete search history.

(56) References Cited

FOREIGN PATENT DOCUMENTS

| | | | |
|---|---|---|---|
| JP | 2006170129 | A | 6/2006 |
| JP | 2006516316 | A | 6/2006 |
| JP | 2008208811 | A | 9/2008 |
| JP | 2009102997 | A | 5/2009 |
| JP | 2009102998 | A | 5/2009 |
| JP | 2014015907 | A | 1/2014 |

\* cited by examiner

FUEL INJECTION CONTROL METHOD AND FUEL INJECTION DEVICE OF SPARK IGNITION TYPE INTERNAL-COMBUSTION ENGINE

BACKGROUND

The present disclosure relates to a fuel injection control method and a fuel injection device for a spark ignition internal combustion engine in which fuel is injected directly into a cylinder.

A patent document 1 discloses a so-called top injection type in-cylinder direct injection spark ignition internal combustion engine, which includes a fuel injection valve including a tip end portion including injection holes, and being structured to inject fuel through the injection holes toward a crown of a piston substantially perpendicularly, namely, along a central axis of a cylinder, wherein the tip end portion of the fuel injection valve is arranged in a central region of a ceiling part of a combustion chamber, namely, in a region of the ceiling part surrounded by intake and exhaust valves. The injection holes are arranged such that each injection hole produces a fuel spray having a central axis along a conical surface having a center substantially at the cylinder central axis.

For normal homogeneous combustion of such a top injection type internal combustion engine, fuel injection is performed during the intake stroke, and ignition is performed by a spark plug at a timing close to MBT before the the top dead center. Fuel injection timing (specifically, fuel injection start timing) has influences on PM (Particulate Matter) and PN (Particulate Number) which are indicators indicative of performance on exhaust particulate matter contained in exhaust gas, and has influences on properties of air-fuel mixture at ignition, and thereby on the fuel efficiency.

Specifically, as the fuel injection timing gets earlier, the properties of air-fuel mixture becomes more preferable because a more sufficient time period is ensured before ignition. Accordingly, as the fuel injection timing gets earlier, the fuel efficiency (for example, indicated specific fuel consumption) gets enhanced. However, if the fuel injection timing is excessively early during the intake stroke where the piston travels from the top dead center to the bottom dead center, the distance between the piston and each injection hole is short, so that injected fuel collides with and adheres to the crown of the piston without vaporization, and pool combustion occurs, thereby adversely affecting the performance on exhaust particulate matter (PM and/or PN).

In view of the foregoing, in general, the fuel injection timing is set as early within an allowable region of the performance on exhaust particulate matter as possible. This optimal fuel injection timing varies depending on an operating state (engine load, engine speed) of the internal combustion engine. Accordingly, for example, it is general to control the fuel injection timing based on a map, wherein the map is prepared for determining the fuel injection timing based on the engine load and engine speed as parameters.

The fuel injection valve is supplied with fuel under a relatively high pressure. As a valve element is lifted, fuel is injected through the injection holes into the combustion chamber having a relatively low internal pressure. This causes the fuel to issue in a narrow spray, while being atomized into minute liquid drops.

The present inventors made a study and made a new finding that if the temperature of fuel immediately before exiting the injection holes is higher than a reference point, when the fuel at high temperature and high pressure is exposed to a low pressure through the injection holes, instantaneous boiling of the fuel, namely, so-called flash boiling, occurs. In typical internal combustion engines, flash boiling does not occur constantly after warming-up, but flash boiling occurs only when the temperature of fuel passing through the injection holes becomes higher than a flash boiling occurrence temperature point due to the engine load and others. With the occurrence of flash boiling, when the fuel exits the injection holes, at least a part of the fuel is vaporized and expanded instantaneously, so that the fuel spray produced in the narrow conical shape by each injection hole spreads more widely. In this way, flash boiling causes an increase in the cone angle of each fuel spray.

The wide spread of each fuel spray serves to promote vaporization of fuel liquid drops, and reduce the penetration of each fuel spray (namely, a distance reached by the fuel spray), when in a state where flash boiling is occurring.

Accordingly, in top injection type internal combustion engines, when flash boiling is occurring, it is unlikely that liquid fuel adheres to the piston crown, even with the same fuel injection timing. Conventionally, the fuel injection timing is controlled in no consideration of whether or not flash boiling is occurring. Therefore, there is room to improve the fuel efficiency.

On the other hand, a patent document 2 discloses a so-called side injection type spark ignition internal combustion engine, which includes a fuel injection valve including a tip end portion including injection holes, and being disposed below an intake port and structured to inject fuel sprays through the injection holes toward a crown of a piston, wherein the tip end portion of the fuel injection valve is arranged between a pair of intake valves, and wherein the fuel sprays as a whole are flat and spread in a sector-shape toward the crown of the piston.

The present inventors made a study and made a finding for the fuel injection valve employed by such a side injection type fuel injection device, that when flash boiling occurs to widen the fuel spray extending from each injection hole, the fuel sprays interfere with each other to form a large collective fuel spray. This causes an increase in the penetration of the fuel spray.

Therefore, in side injection type internal combustion engines, the occurrence of flash boiling may tend to cause more of the fuel to adhere to the piston crown even with the same fuel injection timing, and adversely affect the PM and/or PN.

PRIOR ART DOCUMENT(S)

Patent Document(s)

Patent Document 1: Japanese Patent Application Publication No. 2006-170129

Patent Document 2: Japanese Patent Application Publication No. 2003-322046

SUMMARY

According to a first aspect of the present disclosure, a fuel injection device of a so-called top injection type determines a tip end portion fuel temperature directly or indirectly, wherein the tip end portion fuel temperature is a temperature of fuel at a tip end portion of a fuel injection valve; and sets a fuel injection timing advanced, in response to a condition that the tip end portion fuel temperature is higher than a temperature threshold value, wherein the temperature threshold value relates to flash boiling of fuel at injection holes.

Since the occurrence of flash boiling expands an allowable range of the fuel injection timing to the advance side, wherein the allowable range is limited in terms of performance on exhaust particulate matter, the advance of the fuel injection timing from a normal condition fuel injection timing setpoint serves to make properties of an air-fuel mixture, and thereby enhance the fuel efficiency.

According to a second aspect of the present disclosure, a fuel injection device of a so-called side injection type determines a tip end portion fuel temperature directly or indirectly, wherein the tip end portion fuel temperature is a temperature of fuel at a tip end portion of a fuel injection valve; and sets a fuel injection timing retarded, in response to a condition that the tip end portion fuel temperature is higher than a temperature threshold value, wherein the temperature threshold value relates to flash boiling of fuel at injection holes.

This serves to prevent performance on exhaust particulate matter from being adversely affected by the occurrence of flash boiling. This also serves to allow the fuel injection timing to be set advanced when no flash boiling is occurring, and thereby enhance the fuel efficiency.

DETAILED DESCRIPTION

Figure 1:
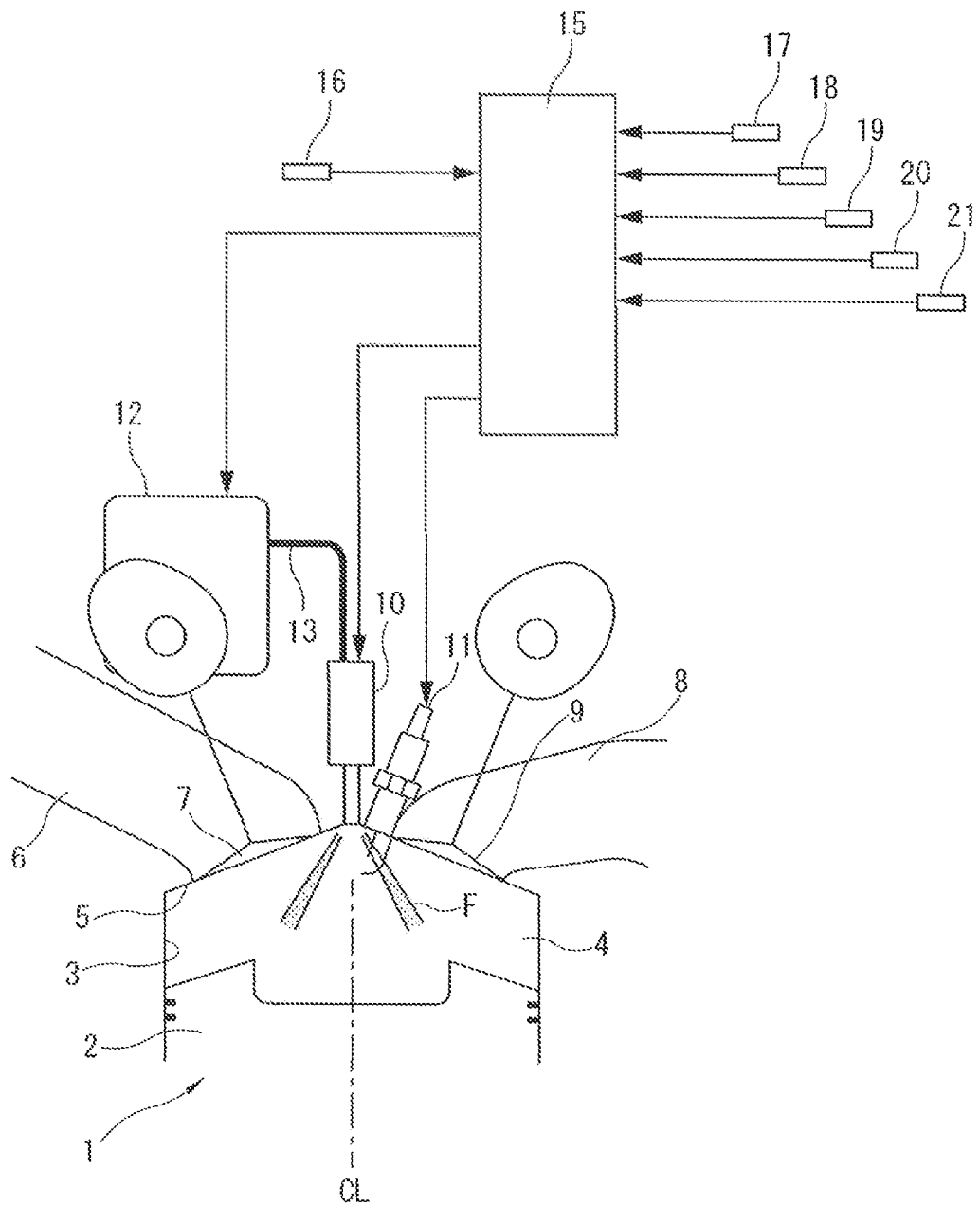
FIG. 1 is an illustrative view showing configuration of a top injection type system according to a first embodiment.

First, the following describes a top injection type fuel injection device according to a first embodiment of the present disclosure. FIG. 1 is an illustrative view showing configuration of a system according to the first embodiment. An internal combustion engine 1 includes cylinders 3, wherein each cylinder 3 is provided with a piston 2 that travels upward and downward in cylinder 3 and defines a combustion chamber 4 in cylinder 3. Combustion chamber 4 includes a ceiling part 5 provided with a pair of intake valves 7 for opening and closing an intake port 6, and a pair of exhaust valves 9 for opening and closing an exhaust port 8. The ceiling part 5 includes a central portion where a fuel injection valve 10 is arranged, wherein fuel injection valve 10 has multiple injection holes for fuel injection by opening and closing action of a valve element through a solenoid or piezoelectric element, etc. Adjacent to fuel injection valve 10, a spark plug 11 is arranged to generate a spark to ignite an air-fuel mixture.

Figure 2:
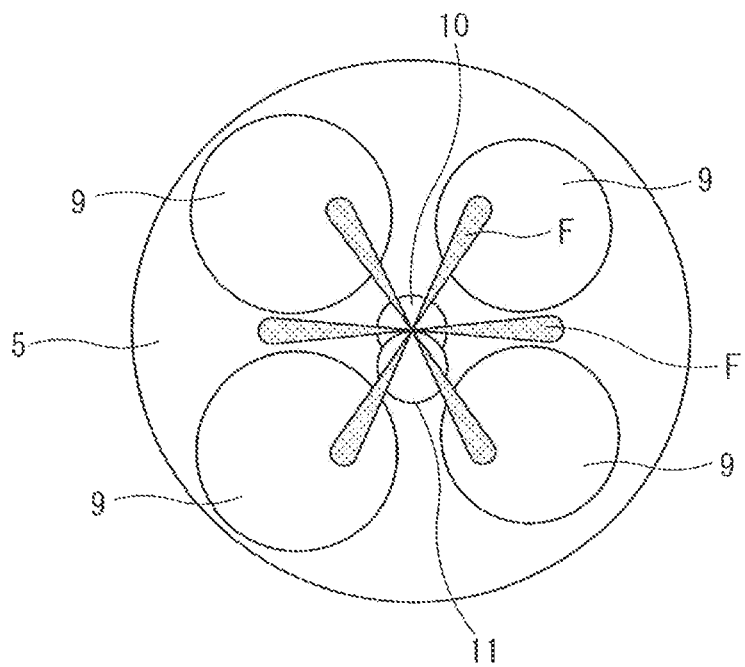
FIG. 2 is an illustrative view showing configuration of a ceiling part of a combustion chamber as viewed from below.

Specifically, as shown in FIG. 2, fuel injection valve 10 includes a tip end portion including injection holes, wherein the tip end portion of fuel injection valve 10 is arranged in a region of ceiling part 5 surrounded by the pair of intake valves 7 and the pair of exhaust valves 9. Fuel injection valve 10 is a hole nozzle injection valve including six injection holes in this example. The six injection holes are arranged to produce six fuel sprays F along a conical surface having a center substantially at a cylinder central axis CL. Each fuel spray F also has a narrow conical shape. The number of the injection holes is not limited to six. The number of intake valves 7 and the number of exhaust valves 9 are also not limited to two.

Fuel injection valve 10 is supplied with fuel that is pressurized by a fuel pump 12 and introduced via a high-pressure fuel pipe 13. Fuel injection valve 10 is structured to inject fuel by lifting of the valve element. A fuel injection quantity is basically proportional to a fuel injection duration. The fuel injection timing (specifically, fuel injection start timing) and the fuel injection quantity (namely, fuel injection duration) of fuel injection valve 10 are controlled by an engine controller 15. Engine controller 15 is connected to various sensors, i.e. an air flow meter 16 for sensing an intake air quantity, an intake pressure sensor 17 for sensing an internal pressure of an intake collector downstream of a throttle valve not shown, a crank angle sensor 18 for indicating an engine speed, an accelerator opening sensor 19 for sensing a quantity of depression of an accelerator pedal by a driver, a water temperature sensor 20 for sensing a temperature of cooling water of internal combustion engine 1, a fuel pressure sensor 21 for sensing a fuel pressure, etc.

The thus-structured internal combustion engine 1 is configured to perform various combustion modes, wherein intake stroke injection is employed in a normally-employed homogeneous combustion mode. Specifically, internal combustion engine 1 performs fuel injection during the intake stroke where piston 2 travels downward from the intake top dead center to the intake bottom dead center, and thereafter ignites the air-fuel mixture at a timing close to MBT before the compression top dead center. The following description is based on the configuration that fuel injection is performed during the intake stroke.

Figure 3:
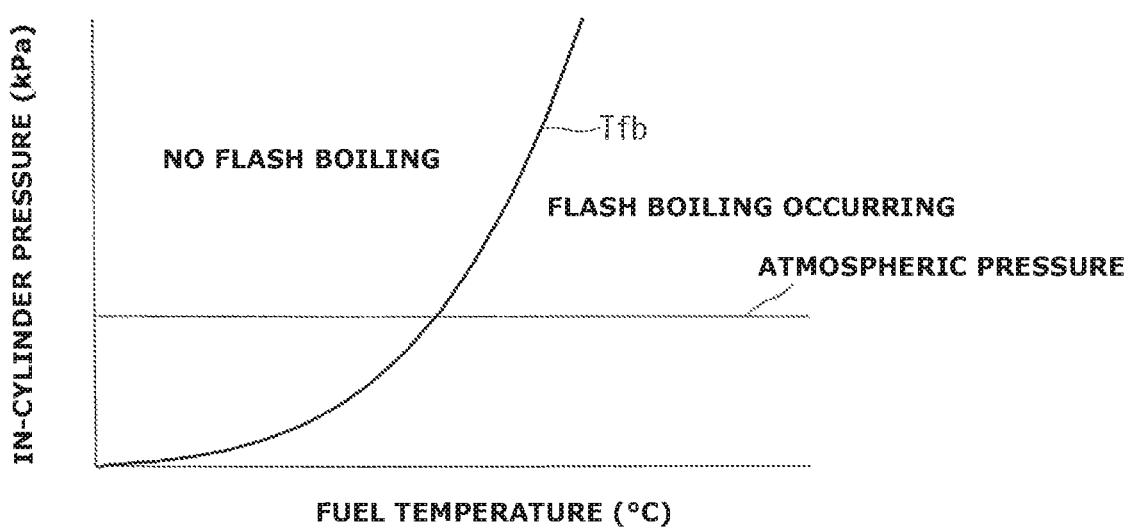
FIG. 3 is a characteristic diagram showing characteristics of a boundary of occurrence of flash boiling with respect to fuel temperature and in-cylinder pressure.

FIG. 3 is a characteristic diagram showing whether or not "flash boiling" occurs, with respect to the temperature of fuel immediately before exiting the injection holes (in other words, at the tip end portion of fuel injection valve 10) and the in-cylinder pressure (namely, the internal pressure of combustion chamber 4) as parameters, wherein flash boiling is a phenomenon that pressurized fuel is boiled and vaporized instantaneously when getting out of the injection holes into combustion chamber 4 having a relatively low pressure. As shown in FIG. 3, when the fuel temperature at the tip end portion of fuel injection valve 10 is higher than a flash boiling temperature point Tfb indicated by a solid line, flash boiling occurs so that at least a part of the fuel is rapidly boiled and vaporized at a time instant when the fuel gets out of the injection holes and gets exposed to the in-cylinder pressure. The flash boiling temperature point Tfb decreases as the in-cylinder pressure decreases. Namely, the flash boiling temperature point Tfb is a function of the in-cylinder pressure. In consideration that intake valves 7 are opened during the intake stroke, the in-cylinder pressure relating to flash boiling may be regarded as being equal to the intake pressure when fuel injection is performed during the intake stroke.

As described above, the occurrence of flash boiling at the injection holes widens the fuel spray F formed by each injection hole (namely, increases the cone angle of each fuel spray F), and thereby promotes vaporization of fuel liquid drops and reduces the penetration of fuel spray F (the distance reached by fuel spray F). This tends to suppress the fuel, which is injected toward the crown of piston 2, from being adhered to the crown of piston 2.

The six injection holes of fuel injection valve 10 are arranged and directed such that the fuel sprays F from the injection holes do not interfere with each other when in a state where flash boiling is occurring. If fuel sprays F are excessively close to each other, fuel sprays F may interfere with each other to form a collective spray having an enlarged penetration when flash boiling is occurring. In case of the top injection type, formed fuel sprays F are far from each other as shown in FIG. 2, so that fuel sprays F do not interfere with each other due to widening of each fuel spray F under the occurrence of flash boiling.

Figure 4:
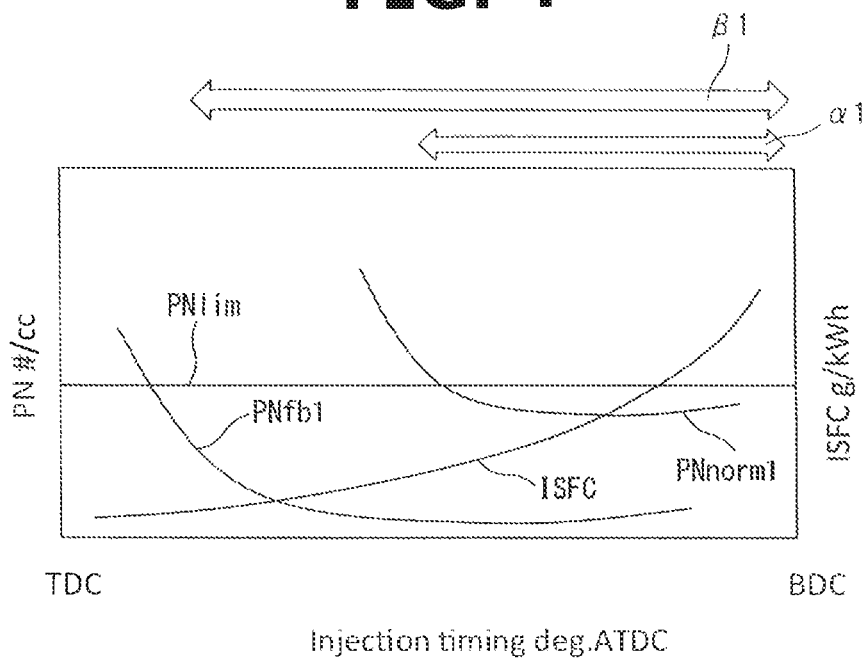
FIG. 4 is a characteristic diagram showing characteristics of PN and indicated specific fuel consumption with respect to fuel injection timing, according to the first embodiment.

FIG. 4 shows characteristics of the PN and indicated specific fuel consumption ISFC that vary depending on the fuel injection timing. As shown in FIG. 4, as the fuel injection timing advances within the intake stroke, namely, as the fuel injection timing gets closer to the top dead center TDC, the indicated specific fuel consumption ISFC decreases. This is because the properties of the air-fuel mixture become preferable and the combustion thereby becomes more preferable, if the fuel is injected more earlier. In contrast to this tendency of the fuel efficiency, the PN indicative of performance on exhaust particulate matter gets worse rapidly as the fuel injection timing gets advanced with respect to a certain point, as indicated by a line PNnorm1. Accordingly, with PNlim indicative of an allowable limit of PN determined by regulations, an allowable range of the fuel injection timing limited in terms of PN is defined by a range $\alpha 1$ from the bottom dead center BDC to the timing when piston 2 travels downward to some extent (for example, around 100° ATDC). In view of fuel efficiency, the advance side is preferable. In overall consideration, under a normal condition (where no flash boiling is occurring), the fuel injection timing is set as close to the advance end of range $\alpha 1$ (the end close to the top dead center TDC) as possible.

On the other hand, when the fuel temperature at the tip end portion of fuel injection valve 10 is higher than the flash boiling temperature point Tfb and flash boiling is occurring, the PN shows characteristics as indicated by a line PNfb1. Specifically, as compared to the line PNnorm1 for the condition where no flash boiling is occurring, the PN is smaller as a whole, and a point of the fuel injection timing where the PN rapidly increases, and also a point of the fuel injection timing where the PN exceeds the allowable limit PNlim, are more advanced (closer to the top dead center TDC). Accordingly, an allowable range of the fuel injection timing limited in terms of PN is defined by a range $\beta 1$ that is more extended to the advance side. This makes it possible to set the fuel injection timing as advanced within range $\beta 1$ as possible, thereby reducing the indicated specific fuel consumption ISFC, namely, enhancing the fuel efficiency.

Figure 5:
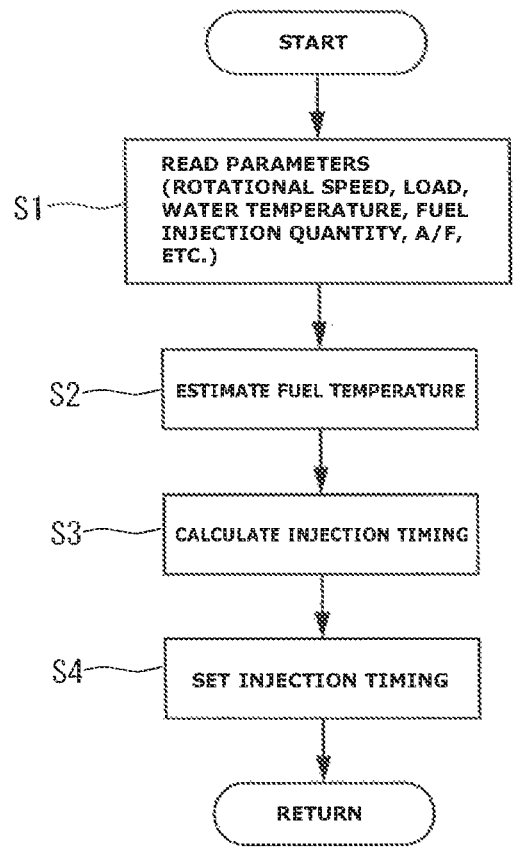
FIG. 5 is a flow chart showing a fuel injection control.

Next, FIG. 5 is a flow chart showing a flow of a process of fuel injection control performed by engine controller 15 according to the first embodiment. The routine shown in the flow chart is executed at each combustion cycle of each cylinder, in this example. In this embodiment, the fuel temperature at the tip end portion of fuel injection valve 10 is determined indirectly, namely, estimated. At Step 1, engine controller 15 reads various parameters required to estimate the fuel temperature and control the fuel injection timing. The parameters include the engine speed, engine load (which may be determined from the intake air quantity, accelerator opening, fuel injection quantity, etc., for example), cooling water temperature, fuel injection quantity, air fuel ratio, intake pressure, etc., of internal combustion engine 1. Then, at Step 2, engine controller 15 estimates the fuel temperature at the tip end portion of fuel injection valve 10.

Figure 6:
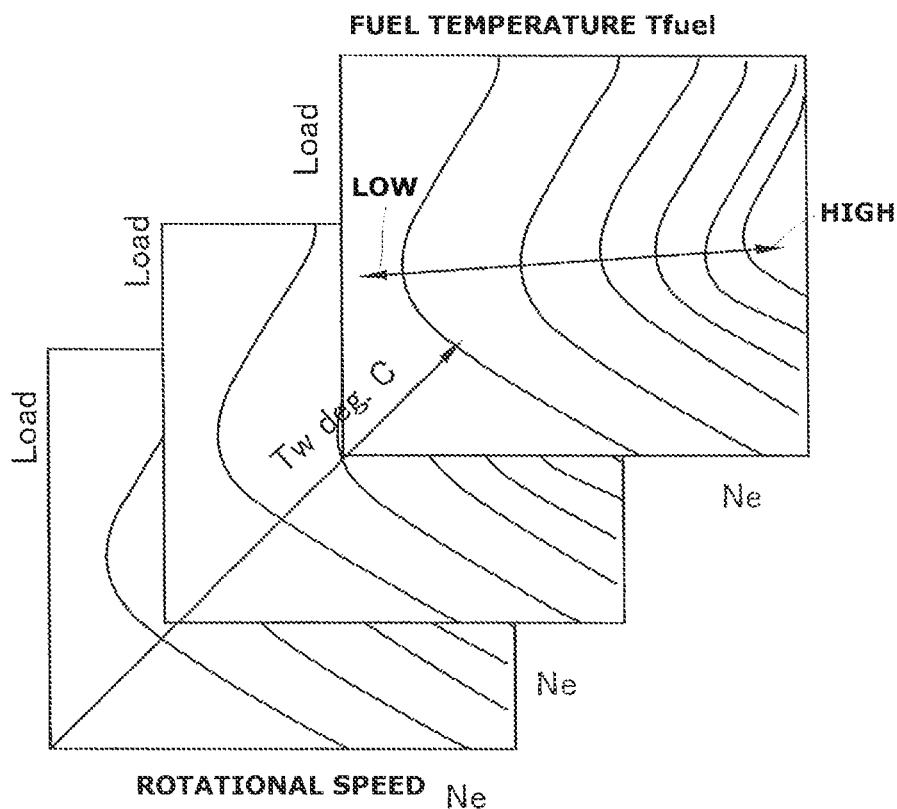
FIG. 6 is a characteristic diagram showing a map for fuel temperature estimation.
Figure 7:
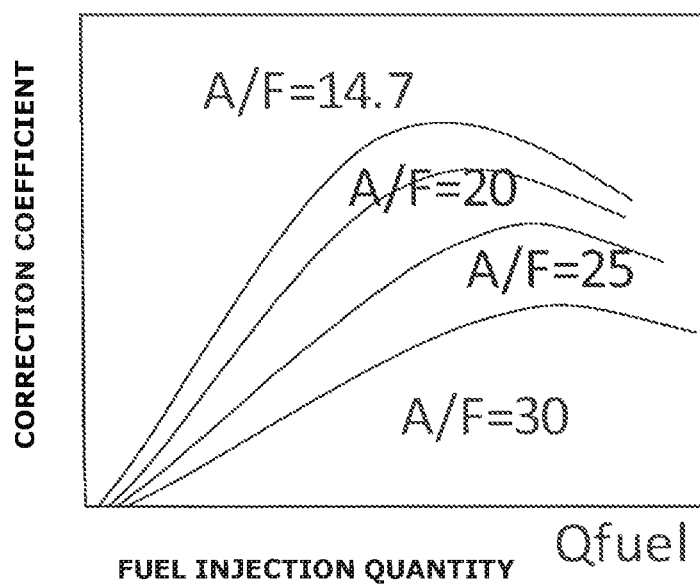
FIG. 7 is a characteristic diagram showing a map for correction during fuel temperature estimation.

The estimation of the fuel temperature is implemented by: an operation of determining an estimated fuel temperature basic value based on the cooling water temperature, engine speed, and engine load; and an operation of determining an estimated fuel temperature value by correcting the estimated fuel temperature basic value by a correction coefficient, wherein the correction coefficient depends on the fuel injection quantity and air fuel ratio. As shown in FIG. 6, a map is prepared per water temperature point, in which each combination of the engine speed and engine load as parameters is allocated with an estimated fuel temperature value. The maps are used to determine the estimated fuel temperature value corresponding to the cooling water temperature, engine speed, and engine load at the moment. The characteristics of the maps shown in FIG. 6 are set based on experiments or simulations or the like for heat inflow and outflow. Basically, as the engine speed increases, the heat per unit time increases, and the estimated fuel temperature increases. As shown in FIG. 7, a map is prepared in which each combination of the fuel injection quantity and air fuel ratio as parameters is allocated with a correction coefficient. This map is used to determine the correction coefficient corresponding to the fuel injection quantity and air fuel ratio at the moment. In this example, the correction coefficient is used to multiply the estimated fuel temperature basic value to obtain a fuel temperature Tfuel as a final value. The thus-estimated fuel temperature Tfuel increases as the air fuel ratio gets closer to a theoretical value of air fuel ratio. In cases where the air fuel ratio is constant, the correction based on the air fuel ratio may be omitted.

According to the present disclosure, fuel injection valve 10 may be provided with a temperature sensor such as a thermocouple for directly sensing the fuel temperature at the tip end portion (portion immediately behind the injection holes) of fuel injection valve 10.

At Step 3, engine controller 15 sets the fuel injection timing IT, taking account of the fuel temperature Tfuel determined by the estimation at Step 2. Then, at Step 4, engine controller 15 records the fuel injection timing IT in a register or the like, and then terminates the overall process. By a routine of fuel injection not shown, when the crank angle reaches the thus-set fuel injection timing IT, fuel injection is started, and is continued during an injection duration equivalent to the fuel injection quantity corresponding to the engine load.

Figure 8:
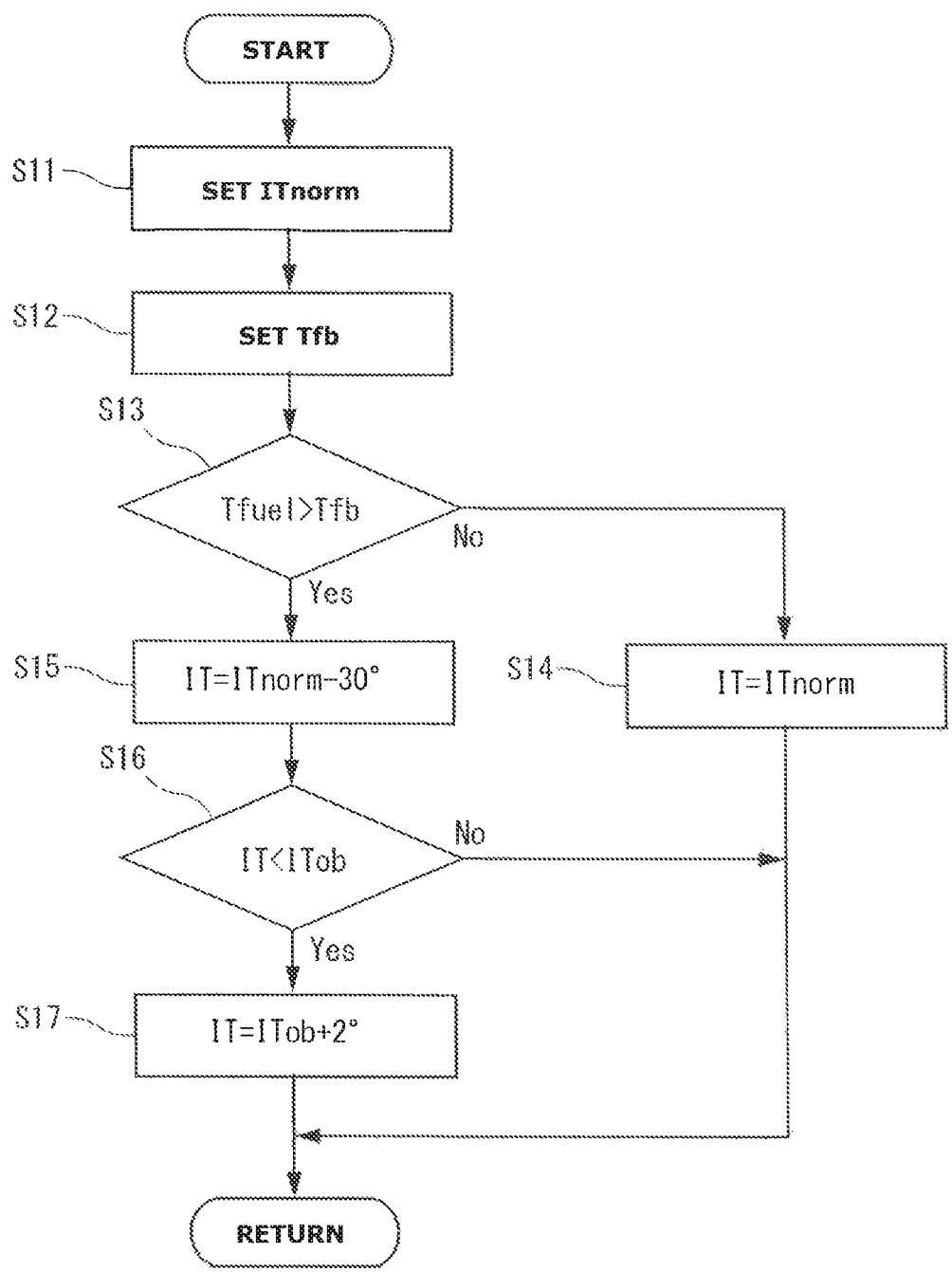
FIG. 8 is a flow chart showing a process of calculation of a fuel injection timing according to the first embodiment.
Figure 9:
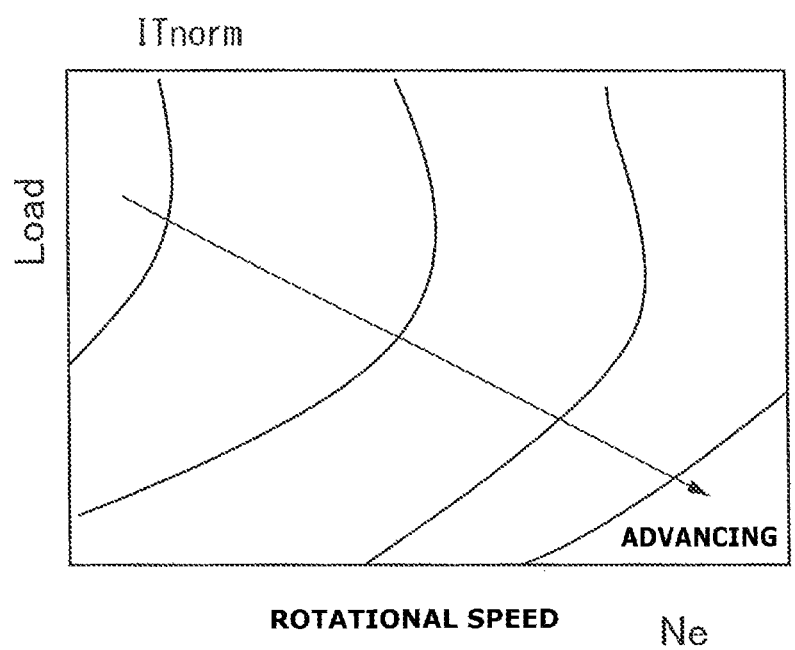
FIG. 9 is a characteristic diagram showing a map for normal condition fuel injection timing setpoint.

FIG. 8 is a flow chart showing a detailed process of the fuel injection timing setting at Step 3 described above. At Step 11, engine controller 15 sets a normal condition fuel injection timing setpoint ITnorm based on the engine speed, engine load, and cooling water temperature at the moment. Specifically, as shown in FIG. 9, a map for normal condition fuel injection timing setpoint is prepared per water temperature point, in which each combination of the engine speed and engine load as parameters is allocated with an optimal fuel injection timing under no occurrence of flash boiling. The map for normal condition fuel injection timing setpoint is used to determine the normal condition fuel injection timing setpoint ITnorm at the moment. The map for normal condition fuel injection timing setpoint is basically set such that as the engine speed increases, the fuel injection timing advances. The normal condition fuel injection timing setpoint ITnorm and the finally-obtained fuel injection timing IT are indicated as crank angles after and with respect to the top dead center ("degATDC") in this example.

Next, at Step 12, engine controller 15 determines the flash boiling temperature point Tfb corresponding to the intake pressure at the moment. Specifically, the relationship shown in FIG. 3 between the in-cylinder pressure (in other words, intake pressure) and the flash boiling temperature point Tfb is defined by a table form beforehand, and this table is referred to for determining the flash boiling temperature point Tfb that is a temperature threshold value relating to flash boiling. However, since the in-cylinder pressure during the intake stroke is determined generally by the engine speed and engine load of internal combustion engine 1, the sensing of the intake pressure may be replaced with determination of the flash boiling temperature point Tfb based on the engine speed and engine load. Furthermore, in cases of normal aspiration engines, the flash boiling temperature point Tfb may be set to a constant value corresponding to a representative value of the intake pressure.

Next, at Step 13, engine controller 15 determines whether or not the fuel temperature Tfuel at the tip end portion of fuel injection valve 10 determined by the estimation at Step 2 is higher than the flash boiling temperature point Tfb. When determining that the fuel temperature Tfuel is lower than or equal to the flash boiling temperature point Tfb, engine controller 15 assumes that no flash boiling occurs, and proceeds to Step 14 where engine controller 15 sets the fuel injection timing IT to the normal condition fuel injection timing setpoint ITnorm.

When determining that the fuel temperature Tfuel is higher than the flash boiling temperature point Tfb, engine controller 15 assumes that flash boiling occurs at the injection holes, and proceeds to Step 15 where engine controller 15 sets the fuel injection timing IT to a value of ITnorm−30°, namely, sets the fuel injection timing IT advanced by 30° (CA) from the normal condition fuel injection timing setpoint ITnorm.

Thereafter, engine controller 15 proceeds from Step 15 to Step 16 where engine controller 15 compares the fuel injection timing IT determined at Step 15 with a preset injection timing advance limit ITob. When determining that the fuel injection timing IT determined at Step 15 is not on the advance side of the injection timing advance limit ITob, engine controller 15 employs the fuel injection timing IT determined at Step 15 as a final value of fuel injection timing IT.

The injection timing advance limit ITob is a limit of the fuel injection timing on the advance side which is determined by other various requirements. When determining that the fuel injection timing IT determined at Step 15 is beyond the injection timing advance limit ITob, engine controller 15 proceeds from Step 16 to Step 17 where engine controller 15 finally sets the fuel injection timing IT to a point retarded from the injection timing advance limit ITob by a small crank angle such as 2° (CA).

In this way, according to the first embodiment, in consideration that the occurrence of flash boiling suppresses the fuel from being adhered to the crown of piston 2, the fuel injection timing IT is corrected and advanced in response to the condition where it is assumed that flash boiling is occurring. This serves to enhance the fuel efficiency (for example, the indicated specific fuel consumption ISFC) while preventing the performance on exhaust particulate matter (for example, PN) from being adversely affected.

Figure 10:
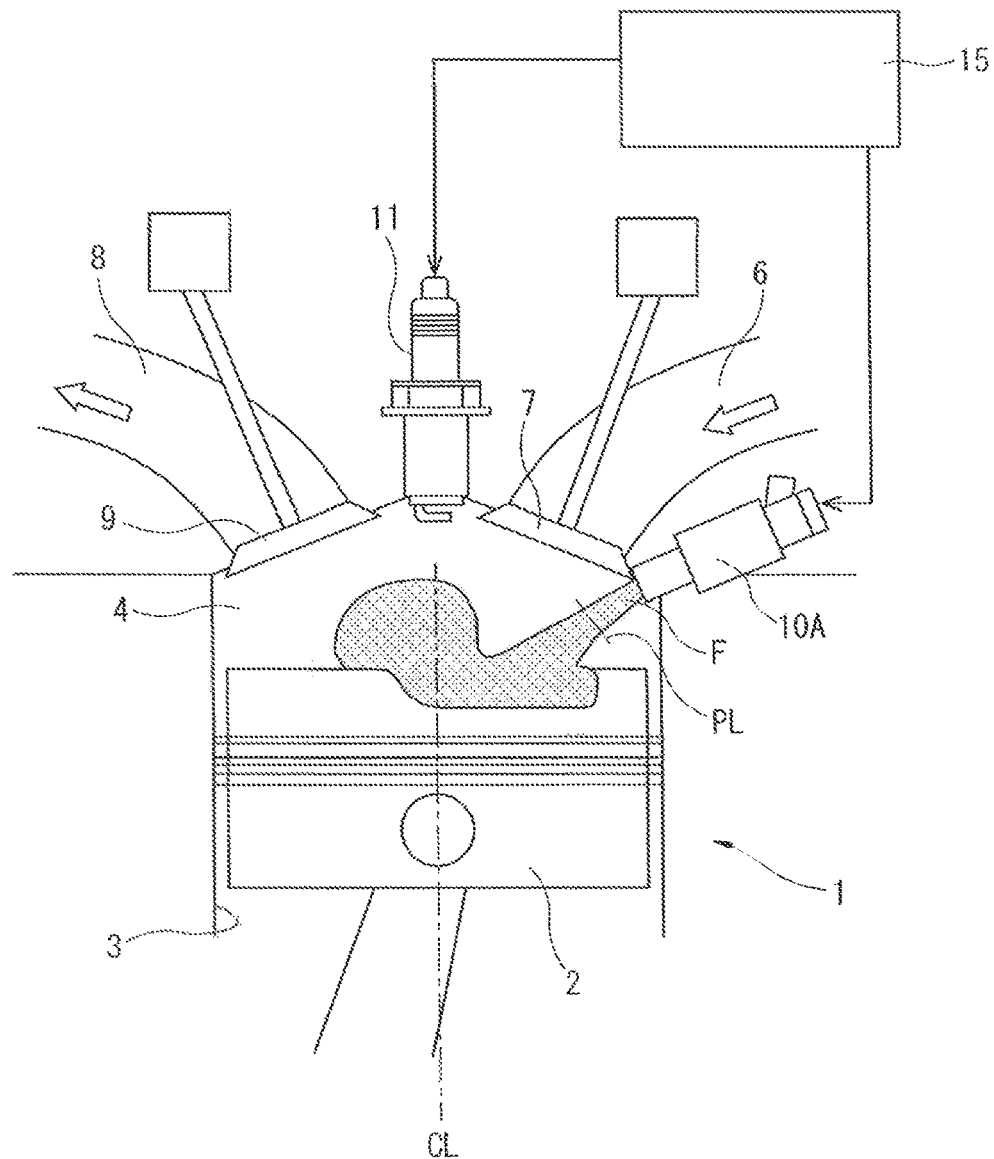
FIG. 10 is an illustrative view showing configuration of a side injection type system according to a second embodiment.

The following describes a side injection type fuel injection device according to a second embodiment of the present disclosure. In the following, redundant description of the same configuration as in the first embodiment is omitted basically. FIG. 10 is an illustrative view showing configuration of a system according to the second embodiment. In the side injection type fuel injection device, a fuel injection valve 10A is arranged below intake port 6, and includes a tip end portion between the pair of intake valves 7. The direction of fuel injection of fuel injection valve 10A is inclined relatively largely from cylinder central axis CL such that fuel is injected diagonally toward the crown of piston 2. Fuel injection valve 10A is a hole nozzle injection valve including six injection holes in this example, wherein the injection holes produce fuel sprays F toward the crown of piston 2, and the fuel sprays F as a whole are flat and spread in a sector shape toward the crown of piston 2.

Figure 11:
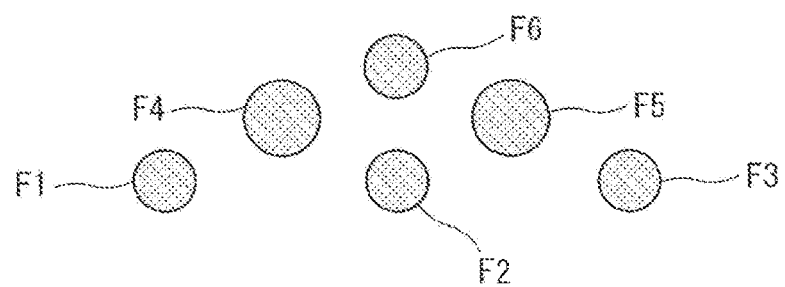
FIG. 11 is an illustrative view showing arrangement of fuel sprays.

FIG. 11 shows arrangement of the six fuel sprays taken along a vertical plane PL shown in FIG. 10. As shown in FIG. 11, the lower three fuel sprays F1-F3 are aligned along a lateral straight line, and above the three, other three fuel sprays F4-F6 are arranged to form a triangle. Accordingly, as a whole, the six fuel sprays are positioned to form a substantially flat triangle. Each fuel spray F has a narrow conical shape. In the present disclosure, the number of the injection holes is not limited to six, and the arrangement of the injection holes is not limited to the one shown in FIG. 11.

Fuel injection valve 10A is supplied with fuel that is pressurized by the fuel pump and introduced via the high-pressure fuel pipe, wherein fuel injection valve 10A contains a valve element, and is structured to inject fuel by lifting of the valve element, as in the first embodiment. The fuel injection timing (specifically, fuel injection start timing) and the fuel injection quantity (namely, fuel injection duration) of fuel injection valve 10A are controlled by engine controller 15, also as in the first embodiment.

The thus-structured internal combustion engine 1 according to the second embodiment is also configured to perform various combustion modes, wherein intake stroke injection is employed in a normally-employed homogeneous combustion mode. Specifically, internal combustion engine 1 performs fuel injection during the intake stroke where piston 2 travels downward from the intake top dead center to the intake bottom dead center, and thereafter ignites the air-fuel mixture at a timing close to MBT before the compression top dead center. The following description is based on the configuration that fuel injection is performed during the intake stroke.

As described above, the occurrence of flash boiling at the injection holes of fuel injection valve 10A widens the fuel spray F formed by each injection hole (namely, increases the cone angle of each fuel spray F). This reduces the penetration of each fuel spray F. However, in case of the side injection type fuel injection valve 10A according to the second embodiment, the fuel sprays F are arranged relatively densely, and thereby interfere with each other, under this condition. Accordingly, the six fuel sprays F interfere with each other to form a large collective spray having a larger penetration (distance reached by the fuel spray) than when no flash boiling is occurring.

In other words, according to the second embodiment, the injection holes of fuel injection valve 10A are arranged and directed such that the fuel sprays F from the injection holes are independent from each other when in a state where no flash boiling is occurring, and such that the fuel sprays F from the injection holes interfere with each other to form a large collective fuel spray when in a state where flash boiling is occurring.

Figure 12:
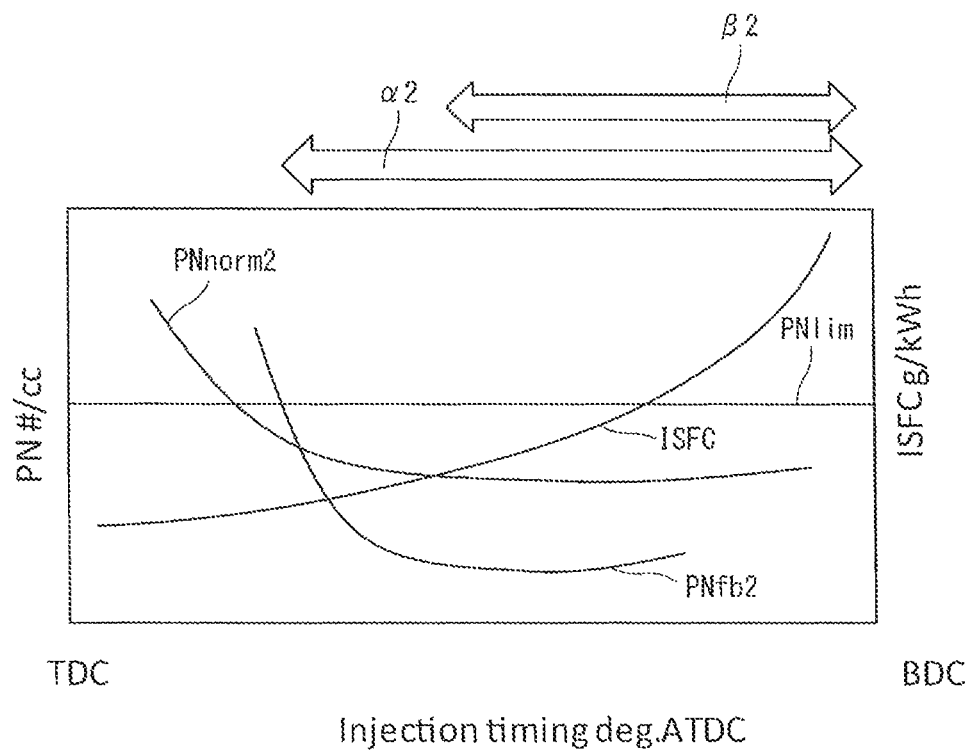
FIG. 12 is a characteristic diagram showing characteristics of PN and indicated specific fuel consumption with respect to fuel injection timing, according to the second embodiment.

FIG. 12 shows characteristics of the PN and indicated specific fuel consumption ISFC that vary depending on the fuel injection timing, according to the second embodiment. When no flash boiling is occurring, the characteristics are basically similar to those of the first embodiment. Namely, regarding the fuel efficiency, as the fuel injection timing advances within the intake stroke, namely, as the fuel injection timing gets closer to the top dead center TDC, the indicated specific fuel consumption ISFC decreases. This is because the properties of the air-fuel mixture become preferable and the combustion thereby becomes more preferable, if the fuel is injected more earlier.

In contrast to that tendency of the fuel efficiency, the PN indicative of performance on exhaust particulate matter gets worse rapidly as the fuel injection timing gets advanced with respect to a certain point, as indicated by a line PNnorm2. Accordingly, with PNlim indicative of an allowable limit of PN determined by regulations, an allowable range of the fuel injection timing limited in terms of PN is defined by a range α2 from the bottom dead center BDC to the timing when piston 2 travels downward to some extent. In view of fuel efficiency, the advance side is preferable. In overall consideration, under a normal condition (where no flash boiling is occurring), the fuel injection timing is set as close to the advance end of range α2 (the end close to the top dead center TDC) as possible.

On the other hand, when the fuel temperature at the tip end portion of fuel injection valve 10A is higher than the flash boiling temperature point Tfb and flash boiling is occurring, the PN shows characteristics as indicated by a line PNfb2. Specifically, as compared to the line PNnorm2 for the condition where no flash boiling is occurring, the PN is smaller when the fuel injection timing is in a retard-side range close to the bottom dead center, and a point of the fuel injection timing where the PN rapidly increases, and also a point of the fuel injection timing where the PN exceeds the allowable limit PNlim, are more retarded (closer to the bottom dead center BDC). Namely, it is conceivable that the occurrence of flash boiling enhances atomization and vaporization, but causes the PN to rapidly get worse when the tip end of the corrective fuel spray having a large penetration reaches the crown of piston 2 and its vicinity. Accordingly, an allowable range of the fuel injection timing limited in terms of PN is defined by a range β2 that is more contracted to the retard side. This makes possible to set the fuel injection timing as advanced within range β2 as possible.

This serves to prevent the PN from being adversely affected, also when flash boiling is occurring. When no flash boiling is occurring, this makes it possible to set the fuel injection timing more advanced (for example, at a point where the PN is out of the allowable range when flash boiling is occurring), thereby reducing the indicated specific fuel consumption ISFC. This serves to enhance the fuel efficiency while preventing the performance on exhaust particulate matter from being adversely affected by the occurrence of flash boiling.

Figure 13:
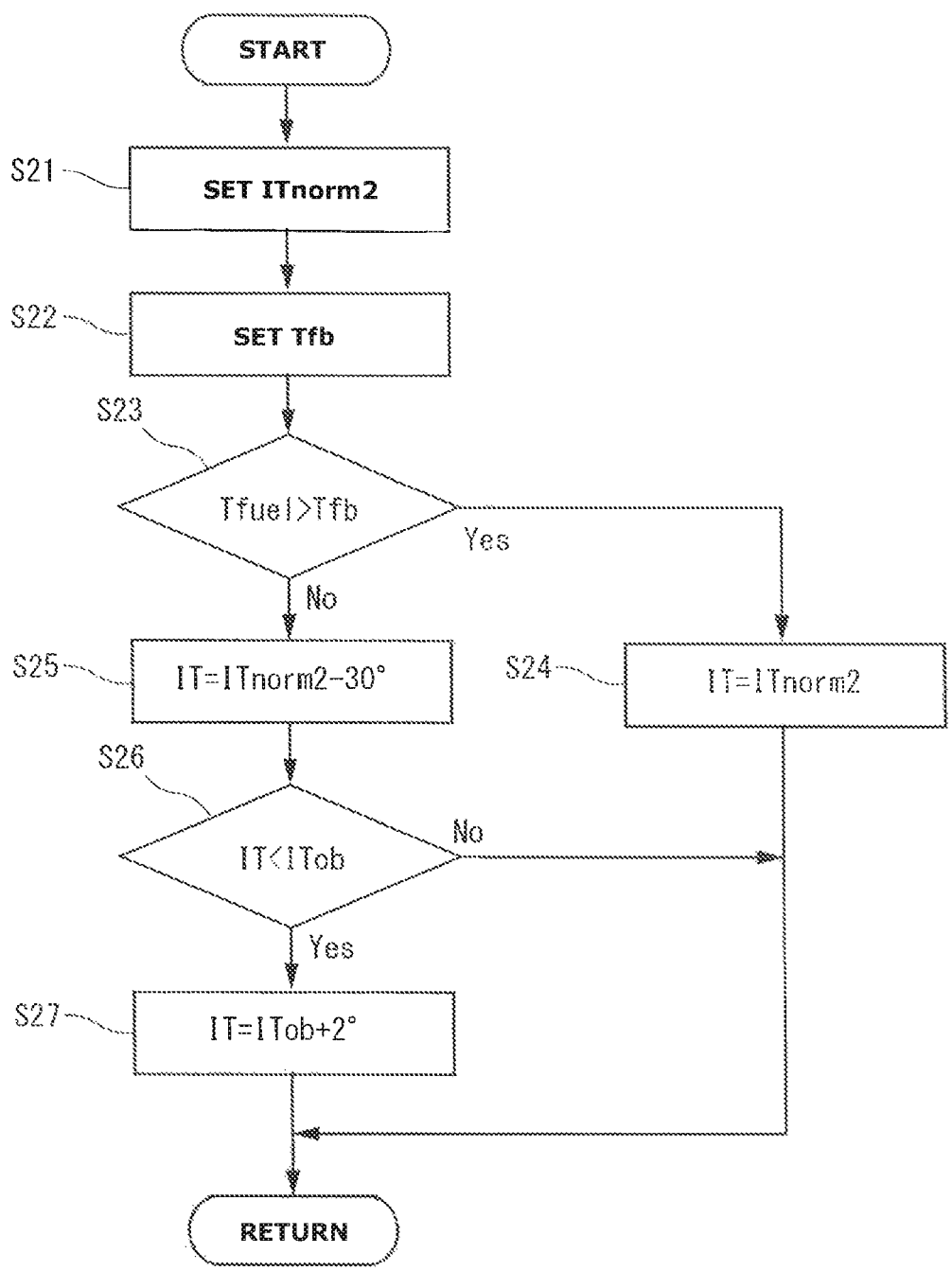
FIG. 13 is a flow chart showing a process of calculation of a fuel injection timing according to the second embodiment.

FIG. 13 is a flow chart showing a detailed process of the fuel injection timing setting at Step 3 in the flow chart of FIG. 5, according to the second embodiment. The first and second embodiments are different from each other in the characteristics of heat inflow and outflow with respect to the fuel near the injections holes. Accordingly, the characteristics of the maps of FIGS. 6 and 7 and others are different from those of the second embodiment, but the flow of the process shown in the flow chart of FIG. 5 is employed by the second embodiment basically as it is.

Figure 14:
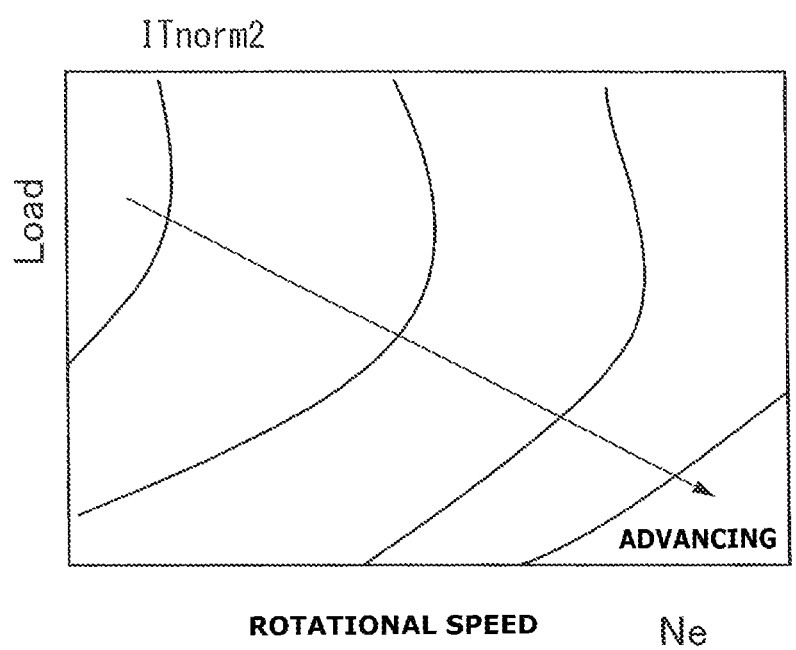
FIG. 14 is a characteristic diagram showing a map for reference fuel injection timing.

At Step 21, engine controller 15 sets a reference fuel injection timing setpoint ITnorm2 based on the engine speed, engine load, and cooling water temperature at the moment. The reference fuel injection timing setpoint ITnorm2 is set with respect to the condition that flash boiling is occurring, where the relatively retarded range is employed as shown in FIG. 12. Specifically, as shown in FIG. 14, a map for reference fuel injection timing setpoint is prepared per water temperature point, in which each combination of the engine speed and engine load as parameters is allocated with an optimal fuel injection timing under the occurrence of flash boiling. The map for reference fuel injection timing setpoint is used to determine the reference fuel injection timing setpoint ITnorm2 at the moment. The map for reference fuel injection timing setpoint is basically set such that as the engine speed increases, the fuel injection timing advances.

Next, at Step 22, engine controller 15 determines the flash boiling temperature point Tfb corresponding to the intake pressure at the moment. As described above, the relationship shown in FIG. 3 between the in-cylinder pressure (in other words, intake pressure) and the flash boiling temperature point Tfb is defined by a table form beforehand, and this table is referred to for determining the flash boiling temperature point Tfb that is a temperature threshold value relating to flash boiling. However, since the in-cylinder pressure during the intake stroke is determined generally by the engine speed and engine load of internal combustion engine 1, the sensing of the intake pressure may be replaced with determination of the flash boiling temperature point Tfb based on the engine speed and engine load. Furthermore, in cases of normal aspiration engines, the flash boiling temperature point Tfb may be set to a constant value corresponding to a representative value of the intake pressure.

Next, at Step 23, engine controller 15 determines whether or not the fuel temperature Tfuel at the tip end portion of fuel injection valve 10A determined by the estimation at Step 2 is higher than the flash boiling temperature point Tfb. When determining that the fuel temperature Tfuel is higher than the flash boiling temperature point Tfb, engine controller 15 assumes that flash boiling occurs, and proceeds to Step 24 where engine controller 15 sets the fuel injection timing IT to the reference fuel injection timing setpoint ITnorm2 based on the occurrence of flash boiling.

When determining that the fuel temperature Tfuel is lower than or equal to the flash boiling temperature point Tfb, engine controller 15 assumes that no flash boiling occurs, and proceeds to Step 25 where engine controller 15 sets the fuel injection timing IT to a value of ITnorm2−30°, namely, sets the fuel injection timing IT advanced by 30° (CA) from the reference fuel injection timing setpoint ITnorm2.

Thereafter, engine controller 15 proceeds from Step 25 to Step 26 where engine controller 15 compares the fuel injection timing IT determined at Step 25 with a preset injection timing advance limit ITob. When determining that the fuel injection timing IT determined at Step 25 is not on the advance side of the injection timing advance limit ITob, engine controller 15 employs the fuel injection timing IT determined at Step 25 as a final value of fuel injection timing IT.

The injection timing advance limit ITob is a limit of the fuel injection timing on the advance side which is determined by other various requirements, as described above. When determining that the fuel injection timing IT determined at Step 25 is beyond the injection timing advance limit ITob, engine controller 15 proceeds from Step 26 to Step 27 where engine controller 15 finally sets the fuel injection timing IT to a point retarded from the injection timing advance limit ITob by a small crank angle such as 2° (CA).

In this way, according to the second embodiment, the fuel injection timing IT is relatively advanced when no flash boiling is occurring, and the fuel injection timing IT is relatively retarded when flash boiling is occurring. This serves to enhance the fuel efficiency (for example, indicated specific fuel consumption ISFC) while preventing the performance on exhaust particulate matter (for example, PN).

The feature of the flow chart of FIG. 13 that the reference fuel injection timing setpoint ITnorm2 is the relatively retarded fuel injection timing point suitable for the condition where flash boiling is occurring, may be modified as in the first embodiment such that the normal condition fuel injection timing setpoint ITnorm is allocated in the map or the like as a fuel injection timing point suitable for the condition where no flash boiling is occurring, and the fuel injection timing is corrected and retarded from the normal condition fuel injection timing setpoint ITnorm when flash boiling is occurring. In this modification, when flash boiling is occurring, the fuel injection timing IT is calculated as ITnorm+30°, for example.

In the first and second embodiments, the flash boiling temperature point Tfb is set with relation to the intake pressure, and is compared with the fuel temperature Tfuel to determine whether or not flash boiling occurs. This may be modified such that this determination is based on the intake pressure (or in-cylinder pressure) and the fuel temperature Tfuel by using the characteristics of FIG. 3. The characteristics of FIG. 3 may be prepared in a map form to make it possible to perform the determination easily.

The present disclosure may be applied to control methods and control devices in which a fuel injection end timing is treated as the fuel injection timing, and the fuel injection end timing is controlled to a target point corresponding to an engine operating condition.

The invention claimed is:

1. A fuel injection control method for a spark ignition internal combustion engine, the spark ignition internal combustion engine including a piston including a crown, a combustion chamber including a ceiling part, intake and exhaust valves disposed at the ceiling part of the combustion chamber, and a fuel injection valve including a tip end portion including injection holes, the fuel injection valve being structured to inject fuel through the injection holes toward the crown of the piston, the tip end portion of the fuel injection valve being arranged in a region of the ceiling part surrounded by the intake and exhaust valves, the fuel injection control method comprising:

determining a tip end portion fuel temperature directly or indirectly, wherein the tip end portion fuel temperature is a temperature of fuel at the tip end portion of the fuel injection valve; and setting a fuel injection timing advanced, in response to a condition that the tip end portion fuel temperature is higher than a temperature threshold value, wherein the temperature threshold value relates to flash boiling of fuel at the injection holes.

2. The fuel injection control method as claimed in claim 1, further comprising:

presetting a normal condition fuel injection timing setpoint, based on engine load and engine speed of the spark ignition internal combustion engine as parameters; and setting the fuel injection timing by adding a preset advancing correction quantity to the normal condition fuel injection timing setpoint, in response to the condition that the tip end portion fuel temperature is higher than the temperature threshold value.

3. The fuel injection control method as claimed in claim 1, further comprising:

setting the temperature threshold value as a function of an intake pressure.

4. The fuel injection control method as claimed in claim 1, further comprising:

setting the temperature threshold value to a constant value corresponding to a representative value of an intake pressure.

5. The fuel injection control method as claimed in claim 1, further comprising:

estimating the tip end portion fuel temperature, based on engine load, engine speed, and cooling water temperature of the spark ignition internal combustion engine.

6. The fuel injection control method as claimed in claim 5, further comprising:

determining the tip end portion fuel temperature by correcting the estimated tip end portion fuel temperature based on air fuel ratio of the spark ignition internal combustion engine.

7. The fuel injection control method as claimed in claim 1, further comprising:

arranging and directing the injection holes such that fuel sprays from the injection holes are out of interference with each other when in a state where flash boiling is occurring.

8. A fuel injection control method for a spark ignition internal combustion engine, the spark ignition internal combustion engine including, a piston including a crown, an intake port, a pair of intake valves, and a fuel injection valve including a tip end portion including injection holes, the fuel injection valve being disposed below the intake port and structured to inject fuel sprays through the injection holes toward the crown of the piston, the tip end portion of the fuel injection valve being arranged between the intake valves, the fuel sprays as a whole being flat and spreading in a sector-shape toward the crown of the piston the fuel injection control method comprising:

determining a tip end portion fuel temperature directly or indirectly, wherein the tip end portion fuel temperature is a temperature of fuel at the tip end portion of the fuel injection valve; and setting a fuel injection timing retarded, in response to a condition that the tip end portion fuel temperature is higher than a temperature threshold value, wherein the temperature threshold value relates to flash boiling of fuel at the injection holes.

9. The fuel injection control method as claimed in claim 8, further comprising:
presetting a normal condition fuel injection timing setpoint, based on engine load and engine speed of the spark ignition internal combustion engine as parameters; and
setting the fuel injection timing by adding a preset retarding correction quantity to the normal condition fuel injection timing setpoint, in response to the condition that the tip end portion fuel temperature is higher than the temperature threshold value.

10. The fuel injection control method as claimed in claim 8, further comprising:
setting the temperature threshold value as a function of an intake pressure.

11. The fuel injection control method as claimed in claim 8, further comprising:
setting the temperature threshold value to a constant value corresponding to a representative value of an intake pressure.

12. The fuel injection control method as claimed in claim 8, further comprising:
estimating the tip end portion fuel temperature, based on engine load, engine speed, and cooling water temperature of the spark ignition internal combustion engine.

13. The fuel injection control method as claimed in claim 12, further comprising:
determining the tip end portion fuel temperature by correcting the estimated tip end portion fuel temperature based on air fuel ratio of the spark ignition internal combustion engine.

14. The fuel injection control method as claimed in claim 8, further comprising:
arranging and directing the injection holes such that the fuel sprays from the injection holes are independent from each other when in a state where no flash boiling is occurring, and such that the fuel sprays from the injection holes interfere with each other to form a large collective fuel spray when in a state where flash boiling is occurring.

15. The fuel injection control method as claimed in claim 1, further comprising:
employing as the fuel injection timing a timing of start of fuel injection.

16. A fuel injection device for a spark ignition internal combustion engine, comprising:
a fuel injection valve including a tip end portion including injection holes, and being structured to inject fuel through the injection holes toward a crown of a piston, wherein the tip end portion of the fuel injection valve is arranged in a region of a ceiling part of a combustion chamber, and wherein the region is surrounded by intake and exhaust valves disposed at the ceiling part; and
a controller configured to control a fuel injection timing of the fuel injection valve;
wherein the controller is configured to:
employ a map for determining a normal condition fuel injection timing setpoint, wherein each combination of engine load and engine speed of the spark ignition internal combustion engine is allocated with a corresponding fuel injection timing setpoint;
determine a tip end portion fuel temperature directly or indirectly, wherein the tip end portion fuel temperature is a temperature of fuel at the tip end portion of the fuel injection valve; and
set the fuel injection timing corrected and advanced, in response to a condition that the tip end portion fuel temperature is higher than a temperature threshold value, wherein the temperature threshold value relates to flash boiling of fuel at the injection holes.

17. A fuel injection device for a spark ignition internal combustion engine, comprising:
a fuel injection valve including a tip end portion including injection holes, and being disposed below an intake port and structured to inject fuel sprays through the injection holes toward a crown of a piston, wherein the tip end portion of the fuel injection valve is arranged between a pair of intake valves, and wherein the fuel sprays as a whole are flat and spread in a sector-shape toward the crown of the piston; and
a controller configured to control a fuel injection timing of the fuel injection valve;
wherein the controller is configured to:
employ a map for determining a normal condition fuel injection timing setpoint, wherein each combination of engine load and engine speed of the spark ignition internal combustion engine is allocated with a corresponding fuel injection timing setpoint;
determine a tip end portion fuel temperature directly or indirectly, wherein the tip end portion fuel temperature is a temperature of fuel at the tip end portion of the fuel injection valve; and
set the fuel injection timing corrected and retarded, in response to a condition that the tip end portion fuel temperature is higher than a temperature threshold value, wherein the temperature threshold value relates to flash boiling of fuel at the injection holes.

18. The fuel injection control method as claimed in claim 8, further comprising:
employing as the fuel injection timing a timing of start of fuel injection.

* * * * *